(12) United States Patent
Kataoka (10) Patent No.: US 10,625,781 B2
(45) Date of Patent: Apr. 21, 2020

(54) VEHICLE DRIVING ASSIST APPARATUS

(71) Applicant: TOYOTA JIDOSHA KABUSHIKI KAISHA, Toyota-shi, Aichi (JP)

(72) Inventor: Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 15/677,276

(22) Filed: Aug. 15, 2017

(65) Prior Publication Data

US 2018/0148093 A1  May 31, 2018

(30) Foreign Application Priority Data

Nov. 30, 2016 (JP) ................... 2016-231983

(51) Int. Cl.
| | |
|---|---|
| *B62D 6/00* | (2006.01) |
| *B60W 30/12* | (2020.01) |
| *G05D 3/00* | (2006.01) |
| *B60W 30/00* | (2006.01) |
| *B62D 15/02* | (2006.01) |
| *G06T 7/20* | (2017.01) |
| *B60W 30/18* | (2012.01) |
| *G06K 9/00* | (2006.01) |

(52) U.S. Cl.
CPC ........ *B62D 15/0255* (2013.01); *B60W 30/12* (2013.01); *B60W 30/18163* (2013.01); *B62D 15/025* (2013.01); *G06T 7/20* (2013.01); *B60W 2520/10* (2013.01); *B60W 2540/18* (2013.01); *B60W 2554/00* (2020.02); *G06K 9/00798* (2013.01); *G06K 9/00805* (2013.01); *G06K 2209/23* (2013.01); *G06T 2207/30236* (2013.01)

(58) Field of Classification Search
None
See application file for complete search history.

(56) References Cited

U.S. PATENT DOCUMENTS

| 8,473,144 | B1* | 6/2013 | Dolgov | ............... | B60W 30/095 |
|---|---|---|---|---|---|
| | | | | | 701/28 |
| 2009/0157247 | A1* | 6/2009 | Sjogren | .................... | B62D 1/28 |
| | | | | | 701/23 |
| 2012/0226392 | A1 | 9/2012 | Kataoka | | |
| 2013/0063595 | A1* | 3/2013 | Niem | .................... | B62D 15/025 |
| | | | | | 348/148 |
| 2016/0185388 | A1* | 6/2016 | Sim | .................... | B62D 15/0255 |
| | | | | | 701/41 |

FOREIGN PATENT DOCUMENTS

WO   2011/064825 A1   6/2011

* cited by examiner

*Primary Examiner* — Adam D Tissot
(74) *Attorney, Agent, or Firm* — Oliff PLC (57) ABSTRACT

A vehicle driving assist apparatus of the invention does not execute a road end line departure prevention control when a next lane vehicle traveling in a next lane is acquired as a road end line and an amount of an operation input to a steering wheel of an own vehicle to cause the own vehicle to move into the next lane, is larger than or equal to a predetermined operation amount.

4 Claims, 7 Drawing Sheets

VEHICLE DRIVING ASSIST APPARATUS

BACKGROUND OF THE INVENTION

Field of the Invention

The invention relates to a vehicle driving assist apparatus for controlling a traveling direction of a vehicle to prevent the vehicle from departing from an end line of a road.

Description of the Related Art

There is known a vehicle driving assist apparatus configured to alert a driver of an own vehicle when the own vehicle nearly departs to an outside of a road from a road end line such as a line defined by a curb installed next to the road which the own vehicle travels and a boundary line between grass and the road (for example, see WO 2011/064825).

Further, there is known a vehicle driving assist apparatus configured to execute a road end line departure prevention control for applying a steering torque to a steering column of the own vehicle, thereby changing a traveling direction of the own vehicle to prevent the own vehicle from departing from the road end line when the own vehicle nearly departs from the road end line to the outside of the road. Hereinafter, this vehicle driving assist apparatus will be referred to as "the conventional apparatus".

When the other vehicle travels in a lane next to a lane in which the own vehicle in the same traveling direction as the traveling direction of the own vehicle, the other vehicle (hereinafter, will be referred to as "the next lane vehicle") may be set as the road end.

When the next lane vehicle is set as the road end line, the driver of the own vehicle may operate the steering wheel in an attempt to move the own vehicle into the lane in which the next lane vehicle travels. In this case, the conventional apparatus may determine that the own vehicle nearly departs from the road end line. In this case, the conventional apparatus executes the road end line departure prevention control. Thereby, the driver of the own vehicle cannot move the own vehicle into the lane next to the lane in which the own vehicle travels.

The invention has been made for solving the problem described above. An object of the invention is to provide a vehicle driving assist apparatus for executing the road end line departure prevention control such that the driver of the own vehicle can move the own vehicle into the lane next to the lane in which the own vehicle travels.

SUMMARY OF THE INVENTION

A vehicle driving assist apparatus according to the invention comprises a camera device (51) and an electric control unit (10, 20). The camera device (51) is mounted on an own vehicle (100) for taking an image of a landscape ahead of the own vehicle (100) and acquiring image data corresponding to data of the taken image.

The electric control unit (10, 20) is configured to acquire a road end line (LEout, LEin) corresponding to a boundary between a road (RD) on which the own vehicle (100) travels and an area (AR) outside of the road (RD), using the image data of the landscape taken by the camera device (51). The electric control unit (10, 20) is further configured to execute a road end line departure prevention control for controlling a traveling direction of the own vehicle (100) to prevent the own vehicle (100) from departing from the acquired road end line (LEout, LEin).

The electric control unit (10 20) is further configured to acquire an input operation amount (θsw) corresponding to an amount of an operation input to a steering wheel of the own vehicle (100) to cause the own vehicle (100) to move into a next lane (LNout, LNin) corresponding to a lane next to a lane (LN) in which the own vehicle (100) travels.

The electric control unit (10, 20) is configured not to execute the road end line departure prevention control when a control prohibition condition that at least one next lane vehicle (101a, 102a) traveling in the next lane (LNout, LNin), is acquired as the road end line (LEout, LEin) and the input operation amount (θsw) is larger than or equal to a predetermined operation amount (θth), is satisfied.

With the vehicle driving assist apparatus according to the invention, when the driver of the own vehicle operates the steering wheel in an attempt to cause the own vehicle to move into the next lane, the road end line departure prevention control is not executed. Thus, the driver can move the own vehicle into the next lane.

According to an aspect of the invention, the control prohibition condition may include a condition that the next lane vehicle does not exist in an area (ARout, ARin) of the next lane (LNout, LNin) into which the own vehicle (100) is trying to move. With the vehicle driving assist apparatus according to this aspect, only when the next lane vehicle does not exist in the area of the next lane into which the own vehicle is trying to move, the road end line departure prevention control is not executed. Thus, the driver can move the own vehicle into the next lane safely.

According to another aspect of the invention, when a target next lane vehicle (101b, 102b) corresponding to the next lane vehicle exists in an area (ARout, ARin) of the next lane (LNout, LNin) into which the own vehicle is trying to move, the control prohibition condition may include a condition that a traveling speed (V) of the own vehicle (100) is smaller than or equal to a first speed (Vth1), a traveling speed (Vout_b, Vin_b) of the target vehicle (101b, 102b) is smaller than or equal to a second speed (Vth2) and a traveling speed (Vout_a, Vin_a) of the next lane vehicle (101a, 102a) traveling in front of the target next lane vehicle (101b, 102b) is smaller than or equal to a third speed (Vth3).

When the traveling speed of the own vehicle, the traveling speed of the target next lane vehicle and the traveling speed of the next lane vehicle traveling in front of the target next lane vehicle are smaller than or equal to a certain speed, respectively, the driver may try to cause the own vehicle to move into between the target next lane vehicle and the next lane vehicle traveling in front of the target next lane vehicle even though the target next lane vehicle exists in the area of the next lane into which the own vehicle is trying to move. At this time, the driver operates the steering wheel in order to cause the own vehicle to approach the next lane. In this case, if the road end line departure prevention control is executed, the driver cannot move the own vehicle into between the target next lane vehicle and the next lane vehicle traveling in front of the target next lane vehicle.

With the vehicle driving assist apparatus according to this aspect, when the traveling speed of the own vehicle is smaller than or equal to the first speed, the traveling speed of the target next lane vehicle is smaller than or equal to the second speed and the traveling speed of the next lane vehicle traveling in front of the target next lane vehicle is smaller than or equal to the third speed, the road end line departure prevention control is not executed even though the target next lane vehicle exists. Thus, the driver can move the own vehicle into between the target next lane vehicle and the next lane vehicle traveling in front of the target next lane vehicle.

According to further another aspect of the invention, the electric control unit (10, 20) may be configured to set the predetermined operation amount (θth) such that the predetermined operation amount (θth) set when the traveling speed (V) of the own vehicle (100) is large, is smaller than the predetermined operation amount (θth) set when the traveling speed (V) of the own vehicle (100) is small. When the steering wheel is considerably operated in order to cause the own vehicle to move into the next lane while the traveling speed of the own vehicle is large, the own vehicle travels unstably. Therefore, in general, the input operation amount input into the steering wheel when the traveling speed of the own vehicle is large, is smaller than the input operation amount input into the steering wheel when the traveling speed of the own vehicle is small. Thus, when the traveling speed of the own vehicle is large, a possibility that the driver is trying to cause the own vehicle to move into the next lane, is large even though the input operation amount is small. With the vehicle driving assist apparatus according to this aspect, the predetermined operation amount set when the traveling speed of the own vehicle is large, is smaller than the predetermined operation amount set when the traveling speed of the own vehicle is small. Thus, it can be accurately determined whether the driver is trying to cause the own vehicle to move into the next lane.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
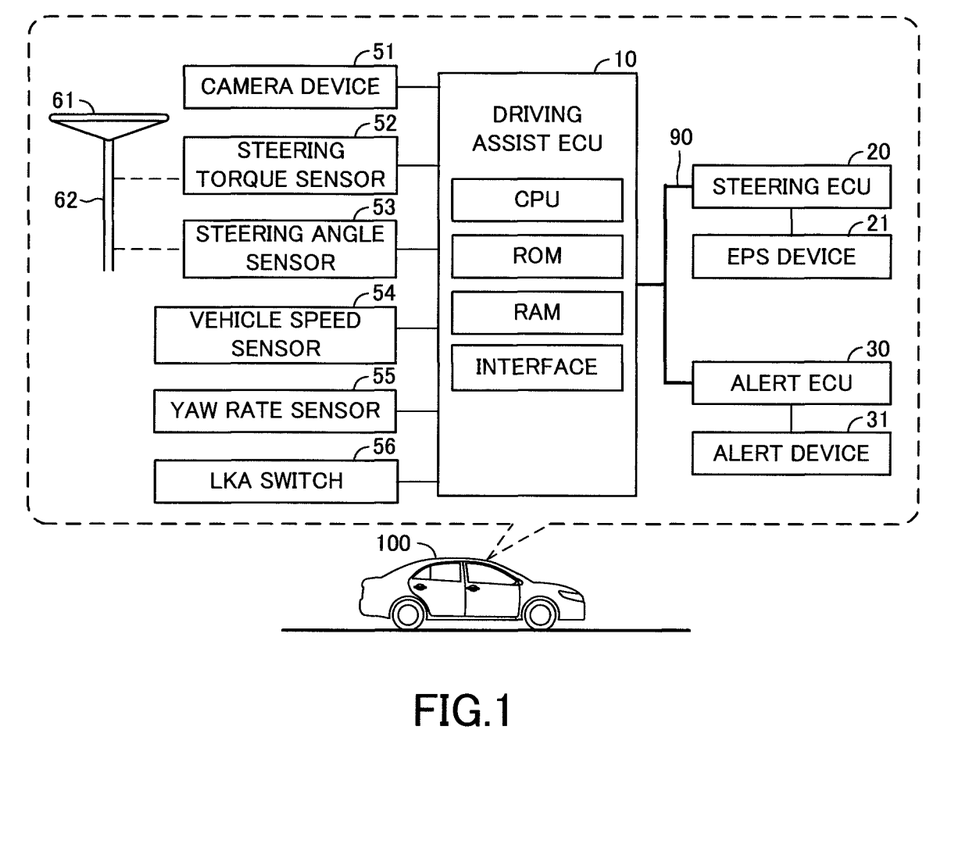
FIG. 1 is a view for showing a vehicle driving assist apparatus according to an embodiment of the invention.

Below, a vehicle driving assist apparatus according to an embodiment of the invention will be described with reference to the drawings. Hereinafter, the vehicle driving assist apparatus according to the embodiment will be referred to as "the embodiment apparatus". The embodiment apparatus is applied to an own vehicle 100 shown in FIGS. 1 and 2. As shown in FIG. 1, the embodiment apparatus includes a driving assist ECU 10, a steering ECU 20 and an alert ECU 30.

The ECU is an electric control unit. Each of the ECUs 10, 20 and 30 is an electronic control circuit including as a main component, a micro-computer including a CPU, a ROM, a RAM, an interface and the like. The CPU realizes various functions described later by executing instructions or routines stored in a memory such as the ROM. Some or all of the ECUs 10, 20 and 30 may be integrated into one ECU.

The driving assist ECU 10, the steering ECU 20 and the alert ECU 30 are electrically connected to each other via a communication/sensor CAN (i.e., Controller Area Network) 90 such that the ECUs 10, 20 and 30 can communicate with each other, in other words, send and receive data to and from each other.

The driving assist ECU 10 is electrically connected to a camera device 51, a steering torque sensor 52, a steering angle sensor 53, a vehicle speed sensor 54, a yaw rate sensor 55 and an LKA switch 56.

Figure 2:
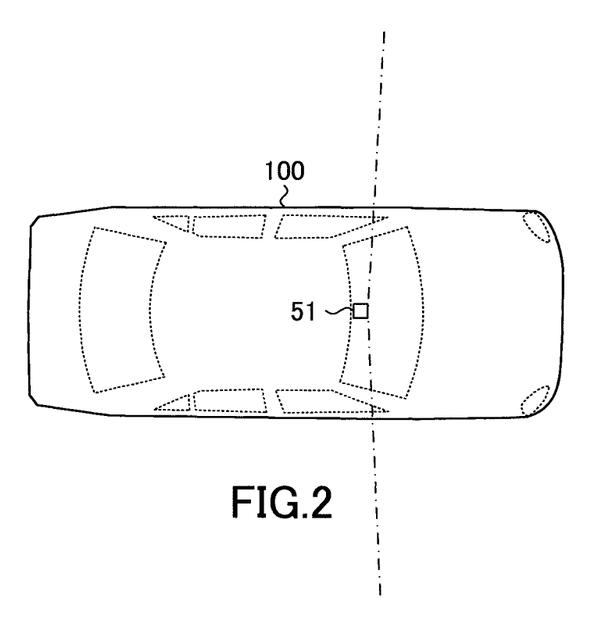
FIG. 2 is a view for showing an own vehicle shown in FIG. 1.

The camera device 51 includes, for example, a CCD camera. As shown in FIG. 2, the camera device 51 is secured to a stay of an inner rear viewer (so-called room mirror) or the like of a front part of a vehicle body of the own vehicle 100.

While the camera device 51 is secured to the vehicle body, the camera device 51 has an optical axis having a predetermined depression angle and aligns with a vehicle traveling direction corresponding to a longitudinal direction of the vehicle body. Thereby, the camera device 51 can take an image of a landscape including a surface of a road on which the own vehicle 100 travels, ahead of the own vehicle 100 in the vehicle traveling direction.

In particular, the camera device 51 can take the image of the landscape in a range from a first position away from the own vehicle 100 by a predetermined distance to a second position remote from the first position ahead of the own vehicle 100. When viewing the own vehicle 100 from the top as shown in FIG. 2, the camera device 51 can take the image of the landscape in a range leftward and rightward from the optical axis by about 90 degrees, respectively. The camera device 51 sends image data corresponding to data of the taken image to the driving assist ECU 10.

Figure 3A:
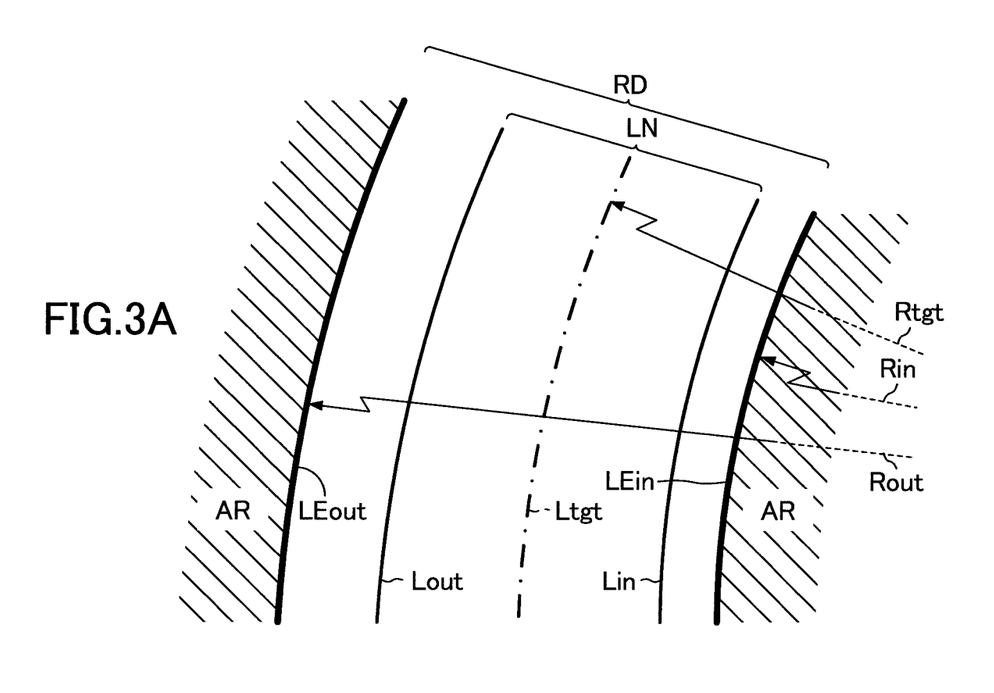
FIG. 3A is a view for showing a road end line and the like when a road curves.
Figure 3B:
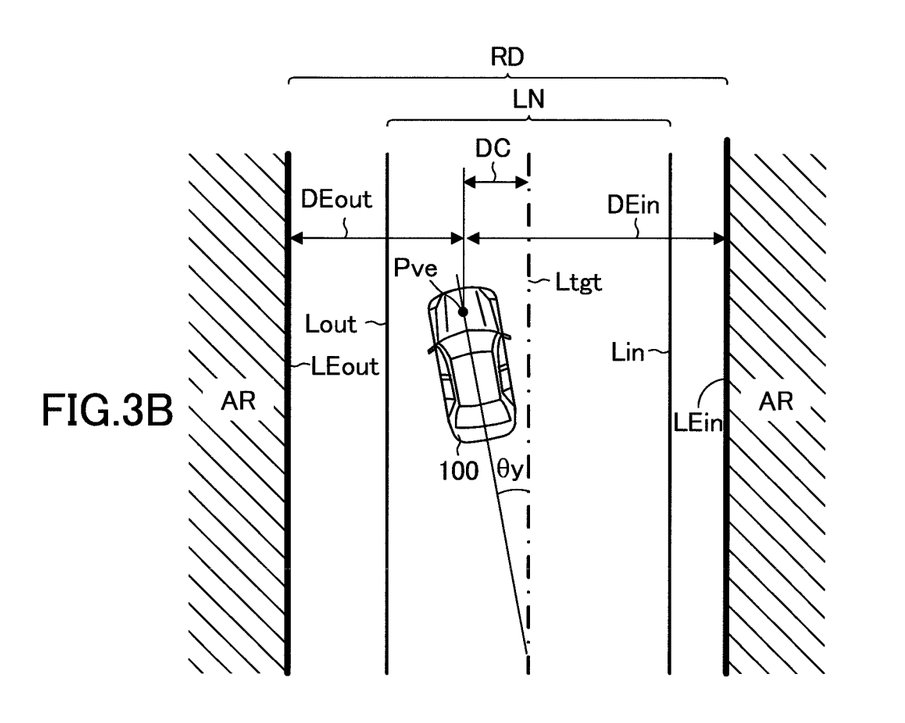
FIG. 3B is a view for showing the road end line and the like when the road extends straight.

The driving assist ECU 10 processes the image data received from the camera device 51 to acquire processed image data. As shown in FIGS. 3A and 3B, the driving assist ECU 10 acquires outer and inner lane markings Lout and Lin drawn on an own vehicle traveling road corresponding to a road RD on which the own vehicle 100 travels, on the basis of the processed image data.

In this embodiment, the outer lane marking Lout is a lane marking drawn at a left side of the own vehicle traveling road RD in the traveling direction of the own vehicle 100. The inner lane marking Lin is a lane marking drawn at a right side of the own vehicle traveling road RD in the traveling direction of the own vehicle 100. Each of the outer and inner lane markings Lout and Lin is a line such as a white solid line or a white chained line or a yellow solid line or a yellow chained line or a combination thereof drawn along the own vehicle traveling road RD.

The driving assist ECU 10 acquires road end lines LEout and LEin, each of which separates the own vehicle traveling road RD from an area AR outside of the own vehicle traveling road RD, using the processed image data. Hereinafter, the road end line LEout located at the left side or an outer side of the own vehicle traveling road RD in the traveling direction of the own vehicle 100 will be referred to as "the outer end line LEout" and the road end line LEin located at the right side or an inner side of the own vehicle traveling road RD in the traveling direction of the own vehicle 100 will be referred to as "the inner end line LEin". In this embodiment, the outer and inner end lines LEout and LEin include road end lines described below, respectively.

(1) A curb which separates the own vehicle traveling road RD from a curbside on which a person walks.

(2) A boundary line between the own vehicle traveling road RD and grass next to the own vehicle traveling road RD.

(3) A boundary line between the own vehicle traveling road RD and the ground next to the own vehicle traveling road RD.

(4) A wall installed next to the own vehicle traveling road RD.

(5) A guard rail installed next to the own vehicle traveling road RD.

(6) An oncoming vehicle corresponding to a vehicle traveling in a lane next to a lane LN on which the own vehicle 100 travels, in a direction opposite to the traveling direction of the own vehicle 100. Hereinafter, the lane LN in which the own vehicle 100 travels, will be referred to as "the own vehicle traveling lane LN".

(7) A medial strip which separates the own vehicle traveling lane LN from the lane in which the oncoming vehicle travels.

(8) A next lane vehicle corresponding to a vehicle traveling or stopped in a lane next to the own vehicle traveling lane LN, in the same direction as the traveling direction of the own vehicle 100.

(9) A stopped vehicle corresponding to a vehicle which stops adjacent to the own vehicle traveling lane LN.

In this embodiment, as shown in FIGS. 3A and 3B, the own vehicle traveling lane LN is an area between the outer and inner lane markings Lout and Lin. The own vehicle traveling road RD is an area between the outer and inner end lines LEout and LEin.

As shown in FIG. 1, the steering torque sensor 52 detects a driver steering torque corresponding to a steering torque TQdr input to a steering wheel 61 by a driver of the own vehicle 100 and sends a signal indicating the driver steering torque TQdr to the driving assist ECU 10. The driving assist ECU 10 acquires the driver steering torque TQdr on the basis of the signal received from the steering torque sensor 52.

The steering angle sensor 53 detects a steering angle corresponding to a rotation angle θsw of the steering wheel 61 with respect to a base position corresponding to a rotation angle of the steering wheel 61 for causing the own vehicle 100 to travel straight and sends a signal indicating the steering angle θsw to the driving assist ECU 10. The driving assist ECU 10 acquires the steering angle θsw on the basis of the signal received from the steering angle sensor 53. When an amount of an operation input into the steering wheel 61 by the driver is referred to as "input operation amount", the input operation amount for causing the own vehicle 100 to travel straight is referred to as "base operation amount" and the base operation amount is zero, the steering angle θsw corresponds to the input operation amount with respect to the base operation amount.

The vehicle speed sensor 54 detects a vehicle speed corresponding to a traveling speed V of the own vehicle 100 and sends a signal indicating the vehicle speed V to the driving assist ECU 10. The driving assist ECU 10 acquires the vehicle speed V on the basis of the signal received from the vehicle speed sensor 54.

The yaw rate sensor 55 detects a yaw rate corresponding to an angular velocity γ of the own vehicle 100 and sends a signal indicating the yaw rate γ to the driving assist ECU 10. The driving assist ECU 10 acquires the yaw rate γ on the basis of the signal received from the yaw rate sensor 55.

The LKA switch 56 is configured to be operated by the driver. When the LKA switch 56 is set at an ON position by the driver, the LKA switch 56 sends an LKA ON signal indicating that the LKA switch 56 is set at the ON position, to the driving assist ECU 10. On the other hand, when the LKA switch 56 is set at an OFF position by the driver, the LKA switch 56 sends an LKA OFF signal indicating that the LKA switch 56 is set at the OFF position, to the driving assist ECU 10.

When the driving assist ECU 10 receives the LKA ON signal, the driving assist ECU 10 is permitted to execute a lane keeping control for controlling the traveling direction of the own vehicle 100 such that the own vehicle 100 travels along a center of the own vehicle traveling lane LN. On the other hand, when the driving assist ECU 10 receives the LKA OFF signal, the driving assist ECU 10 is prohibited to execute the lane keeping control. Hereinafter, the lane keeping control will be referred to as "the LKA control".

An electric-powered steering device 21 is a known device. The electric-powered steering device 21 is configured to apply a steering torque TQ to a steering column 62. The electric-powered steering device 21 is electrically connected to the steering ECU 20. Hereinafter, the electric-powered steering device 21 will be referred to as "the EPS device 21".

The steering ECU 20 calculates or acquires a target assist steering torque TQtgt corresponding to the steering torque TQ to be applied to the steering column 62 to assist a steering operation of the driver on the basis of the driver steering torque TQdr. The steering ECU 20 controls an activation of the EPS device 21 such that the steering torque TQ corresponding to the steering torque TQtgt is applied to the steering column 62.

In addition, when the steering ECU 20 receives from the driving assist ECU 10, an LKA command signal for commanding the steering ECU 20 to apply an LKA torque TQ_LKA calculated as described later to the steering column 62, the steering ECU 20 controls the activation of the EPS device 21 to apply the steering torque TQ corresponding to the LKA torque TQ_LKA to the steering column 62 without applying the steering torque TQ corresponding to the target assist steering torque TQtgt to the steering column 62.

On the other hand, when the steering ECU 20 receives from the driving assist ECU 10, an LDA command signal for commanding the steering ECU 20 to apply the steering torque TQ corresponding to an LDA steering torque TQ_LDAout or TQ_LDAin calculated as described later to the steering column 62, the steering ECU 20 controls the activation of the EPS device 21 to apply the steering torque TQ corresponding to the LDA steering torque TQ_LDAout or TQ_LDAin to the steering column 62 without applying the steering torque TQ corresponding to the target assist steering torque TQtgt to the steering column 62.

An alert device 31 is a known device and provided in an interior of the own vehicle 100. The alert device 31 includes an alert lamp and/or an alert sound generation device such as a buzzer provided on an instrument panel. The alert device 31 is configured to provide a passenger or passengers of the own vehicle 100, in particular, the driver with alert information for informing the driver that the own vehicle 100 departs or nearly departs from the own vehicle traveling road RD beyond the road end line LEout or LEin. The alert device 31 is electrically connected to the alert ECU 30.

When the alert ECU 30 receives from the driving assist ECU 10, an alert command signal for commanding the alert ECU 30 to provide the passenger(s), in particular, the driver with the alert information, the alert ECU 30 controls an activation of the alert device 31 to provide the passenger(s) with the alert information.

Summary of Operation of Embodiment Apparatus

Below, a summary of an operation of the embodiment apparatus will be described. The embodiment apparatus is configured to execute one of the LKA control for controlling the traveling direction of the own vehicle 100 to cause the own vehicle 100 to travel at the center of the own vehicle traveling lane LN and a road end line departure prevention control for controlling the traveling direction of the own vehicle 100 to prevent the own vehicle 100 from departing from the own vehicle traveling road RD beyond the road end line LEout or LEin. Below, the LKA control and the road end line departure prevention control will be described. Hereinafter, the road end line departure prevention control will be referred to as "the LDA control".

As shown in FIGS. 3A and 3B, the embodiment apparatus sets a line passing through a center position between the outer and inner lane markings Lout and Lin as a target moving line Ltgt. In addition, the embodiment apparatus acquires a radius of a curve drawn by the target traveling line Ltgt as a target curvature radius Rtgt. In this embodiment, when the target traveling line Ltgt is straight, the embodiment apparatus acquires an infinite value as the target curvature radius Rtgt.

Further, as shown in FIG. 3B, the embodiment apparatus acquires a traveling line distance corresponding to a distance DC between a base point Pve of the own vehicle 100 and the target traveling line Ltgt in a width direction of the own vehicle traveling road RD. In addition, the embodiment apparatus acquires a yaw angle corresponding to a misalignment angle θy defined between an extending direction of the target traveling line Ltgt and an orientation direction of the own vehicle 100. In this embodiment, the base point Pve of the own vehicle 100 is a point located on a shaft connecting the right and left front wheels of the own vehicle 100 to each other and a center of the shaft in the width direction of the own vehicle 100. Hereinafter, the base point Pve will be referred to as "the vehicle base point Pve".

Furthermore, the embodiment apparatus acquires an outer end distance corresponding to a distance DEout between the vehicle base point Pve and the outer end line LEout in the width direction of the own vehicle traveling road RD. In addition, the embodiment apparatus acquires an inner end distance corresponding to a distance DEin between the vehicle base point Pve and the inner end line LEin in the width direction of the own vehicle traveling road RD.

Further, the embodiment apparatus acquires an outer end distance correlation value DEout_sk by subtracting the outer end line distance DEout from a base distance DEref (i.e., DEout_sk=DEref−DEout) and an inner end distance correlation value DEin_sk by subtracting the inner end line distance DEin from the base distance DEref (i.e., DEin_sk=DEref−DEin).

When the LKA switch 56 is set at the ON position, the embodiment apparatus applies the vehicle speed V, the target curvature radius Rtgt, the traveling line distance DC and the yaw angle θy to an expression (1) described below to acquire the LKA torque TQ_LKA to be applied from the EPS device 21 to the steering column 62 by the LKA control.

$$TQ\_LKA = K1\_LKA \cdot (V^2/Rtgt) + K2\_LKA \cdot DC + K3\_LKA \cdot \theta y \quad (1)$$

In the expression (1), each of parameters "K1_LKA", "K2_LKA" and "K3_LKA" is a control gain and may be a constant value or a value which increases as the vehicle speed V increases. It should be noted that when the LKA switch 56 is set at the OFF position, the embodiment apparatus sets the LKA torque TQ_LKA to zero.

Further, a first term of a right-hand side of the expression (1) is a feedforward torque component determined, depending on the target curvature radius Rtgt and the vehicle speed V. A second term of the right-hand side of the expression (1) is a feedback torque component for decreasing the traveling line distance DC which is a positional misalignment of the own vehicle 100 with respect to the target traveling line Ltgt in the width direction of the own vehicle traveling road RD. A third term of the right-hand side of the expression (1) is a feedback torque component for decreasing the yaw angle θy.

Independently of a set position of the LKA switch 56, when the outer end line distance DEout becomes smaller than or equal to a predetermined distance DEth and the embodiment apparatus is permitted to execute an outer end line LDA control for preventing the own vehicle 100 from departing from the own vehicle traveling road RD beyond the outer end line LEout, the embodiment apparatus applies the vehicle speed V, the target curvature radius Rtgt, the outer end line distance correlation value DEout_sk, the yaw angle θy, the yaw rate γ and a target yaw rate γtgt to an expression (2) described below to acquire the LDA torque TQ_LDAout to be applied from the EPS device 21 to the steering column 62, thereby preventing the own vehicle 100 from departing from the own vehicle traveling road RD beyond the outer end line LEout. Hereinafter, the steering torque TQ_LDAout will be referred to as "the outer end line LDA torque TQ_LDAout".

$$TQ\_LDAout = K1\_LDAout \cdot (V^2/Rtgt) + K2\_LDAout \cdot DEout\_sk + K3\_LDAout \cdot \theta y + K4\_LDAout \cdot (\gamma tgt - \gamma) \quad (2)$$

In the expression (2), each of parameters K1_LDAout to K4_LDAout is a control gain and is set to a value which increases as the vehicle speed V increases. The control gains K1_LDAout to K3_LDAout are set to values larger than the control gains K1_LKA to K3_LKA used for calculating the LKA torque TQ_LKA, respectively.

Further, a first term of a right-hand side of the expression (2) is a feedforward torque component determined, depending on the target curvature radius Rtgt and the vehicle speed V. A second term of the right-hand side of the expression (2) is a feedback torque component for restraining the own vehicle 100 from approaching the outer end line LEout in the width direction of the own vehicle traveling road RD. A third term of the right-hand side of the expression (2) is a feedback torque component for decreasing the yaw angle θy. The target yaw rate γtgt is set to a value based on a sum of the first to third terms of the right-hand side of the expression (2). A fourth term of the right-hand side of the expression (2) is a feedback torque component for decreasing a difference between the target yaw rate γtgt and the yaw rate γ. In this regard, a value acquired by multiplying a difference between a target lateral acceleration Gytgt and a lateral acceleration Gy of the own vehicle 100 detected by a lateral acceleration sensor (not shown) for detecting the lateral acceleration Gy of the own vehicle 100, by a control gain may be used as the fourth term of the right-hand side of the expression (2). Otherwise, the fourth term of the right-hand side of the expression (2) may be omitted.

Then, the embodiment apparatus compares the LKA torque TQ_LKA with the outer end line LDA torque TQ_LDAout. When the outer end line LDA torque TQ_LDAout is larger than the LKA torque TQ_LKA, the embodiment apparatus executes the outer end line LDA control. In this case, the embodiment apparatus causes the EPS device 21 to apply the steering torque TQ corresponding to the outer end line LDA torque TQ_LDAout to the steering column 62.

On the other hand, independently of the set position of the LKA switch 56, when the inner end line distance DEin becomes smaller than or equal to the predetermined distance DEth and the embodiment apparatus is permitted to execute an inner end line LDA control for preventing the own vehicle 100 from departing from the own vehicle traveling road RD beyond the inner end line LEin, the embodiment apparatus applies the vehicle speed V, the target curvature radius Rtgt, the inner end line distance correlation value DEin_sk, the yaw angle θy, the yaw rate γ and the target yaw rate γtgt to an expression (3) described below to acquire the LDA torque TQ_LDAin to be applied from the EPS device 21 to the steering column 62, thereby preventing the own vehicle 100 from departing from the own vehicle traveling road RD beyond the inner end line LEin. Hereinafter, the LDA torque TQ_LDAin will be referred to as "the inner end line LDA torque TQ_LDAin".

$$TQ\_LDAin=K1\_LDAin\cdot(V^2/Rtgt)+K2\_LDAin\cdot DEin\_sk+K3\_LDAin\cdot\theta y+K4\_LDAin\cdot(\gamma tgt-\gamma) \quad (3)$$

In the expression (3), each of parameters K1_LDAin to K4_LDAin is a control gain and is set to a value which increases as the vehicle speed V increases. It should be noted that the control gains K1_LDAin to K3_LDAin are set to values larger than the control gains K1_LKA to K3_LKA used for calculating the LKA torque TQ_LKA, respectively.

Further, a first term of a right-hand side of the expression (3) is a feedforward torque component determined, depending on the target curvature radius Rtgt and the vehicle speed V. A second term of the right-hand side of the expression (3) is a feedback torque component for restraining the own vehicle 100 from approaching the inner end line LEin in the width direction of the own vehicle traveling road RD. A third term of the right-hand side of the expression (3) is a feedback torque component for decreasing the yaw angle θy. The target yaw rate γtgt is set to a value based on a sum of the first to third terms of the right-hand side of the expression (3). A fourth term of the right-hand side of the expression (3) is a feedback torque component for decreasing a difference between the target yaw rate γtgt and the yaw rate γ. In this regard, a value acquired by multiplying the difference between the target lateral acceleration Gytgt and the lateral acceleration Gy of the own vehicle 100 by a control gain may be used as the fourth term of the right-hand side of the expression (3). Otherwise, the fourth term of the right-hand side of the expression (3) may be omitted.

Then, the embodiment apparatus compares the LKA torque TQ_LKA with the inner end line LDA torque TQ_LDAin. When the inner end line LDA torque TQ_LDAin is larger than the LKA torque TQ_LKA, the embodiment apparatus executes the inner end line LDA control. In this case, the embodiment apparatus causes the EPS device 21 to apply the steering torque TQ corresponding to the inner end line LDA torque TQ_LDAin to the steering column 62.

On the other hand, when the LKA torque TQ_LKA is larger than or equal to the outer and inner end line LDA torques TQ_LDAout and TQ_LDAin, the embodiment apparatus executes the LKA control. In this case, the embodiment apparatus causes the EPS device 21 to apply the steering torque TQ corresponding to the LKA torque TQ_LKA to the steering column 62.

In this embodiment, the predetermined distance DEth is set to a value capable of controlling the traveling direction of the own vehicle 100 to prevent the own vehicle 100 from departing from the outer or inner end line LEout or LEin by applying the steering torque TQ smaller than or equal to an upper limit of the steering torque TQ capable of changing the traveling direction of the own vehicle 100 safely when the embodiment apparatus starts an execution of the outer or inner end line LDA control in response to the outer or inner end line distance DEout or DEin decreasing to the predetermined distance DEth.

Further, the predetermined distance DEth is set a value which increases as the vehicle speed V increases. In addition, the predetermined distance DEth is set a value which increases as the yaw angle θy increases.

Figure 4:
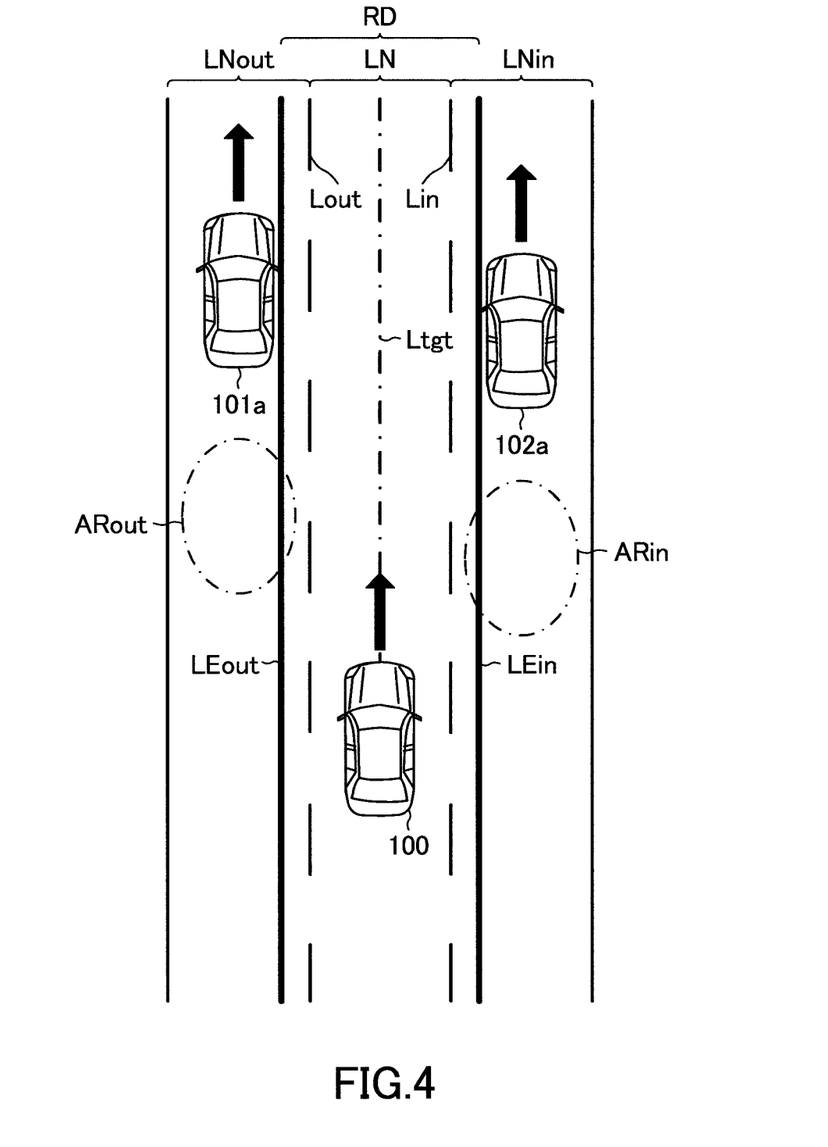
FIG. 4 is a view used for describing an operation of the vehicle driving assist apparatus according to the embodiment when a next lane vehicle exists in a lane next to an own vehicle traveling lane.

As shown in FIG. 4, the other vehicle 101a may travel ahead of the own vehicle 100 on the left in a lane LNout next to the own vehicle traveling lane LN outward within a range which the camera device 51 can take the image of the other vehicle 101a. In this case, the embodiment apparatus acquires a line extending through a right surface of the other vehicle 101a as the outer end line LEout. Hereinafter, the other vehicle such as the other vehicle 101a traveling in the lane LNout next to the own vehicle traveling lane LN will be referred to as "the next lane vehicle" and the lane LNout will be referred to as "the outer next lane LNout".

Similarly, the other vehicle 102a may travel ahead of the own vehicle 100 on the right in a lane LNin next to the own vehicle traveling lane LN inward within a range which the camera device 51 can take the image of the other vehicle 102a. In this case, the embodiment apparatus acquires a line extending through a left surface of the other vehicle 102a as the inner end line LEin. Hereinafter, the other vehicle such as the other vehicle 102a traveling in the lane LNin next to the own vehicle traveling lane LN will be also referred to as "the next lane vehicle" and the lane LNin will be referred to as "the inner next lane LNout".

When the line extending along the right surface of the next lane vehicle such as the next lane vehicle 101a is acquired as the outer end line LEout, the driver may operate (i.e., rotate) the steering wheel 61 by a certain amount or more in an attempt to cause the own vehicle 100 to move into the outer next lane LNout. In this case, since the outer end line LDA control is executed on the basis of the outer end line LEout, the driver cannot cause the own vehicle 100 to move into the outer next lane LNout.

When the line extending along the left surface of the next lane vehicle such as the next lane vehicle 102a is acquired as the inner end line LEin, the driver may operate (i.e., rotate) the steering wheel 61 by a certain amount or more in an attempt to cause the own vehicle 100 to move into the inner next lane LNin. In this case, since the inner end line LDA control is executed on the basis of the inner end line LEin, the driver cannot cause the own vehicle 100 to move into the inner next lane LNin.

Figure 5:
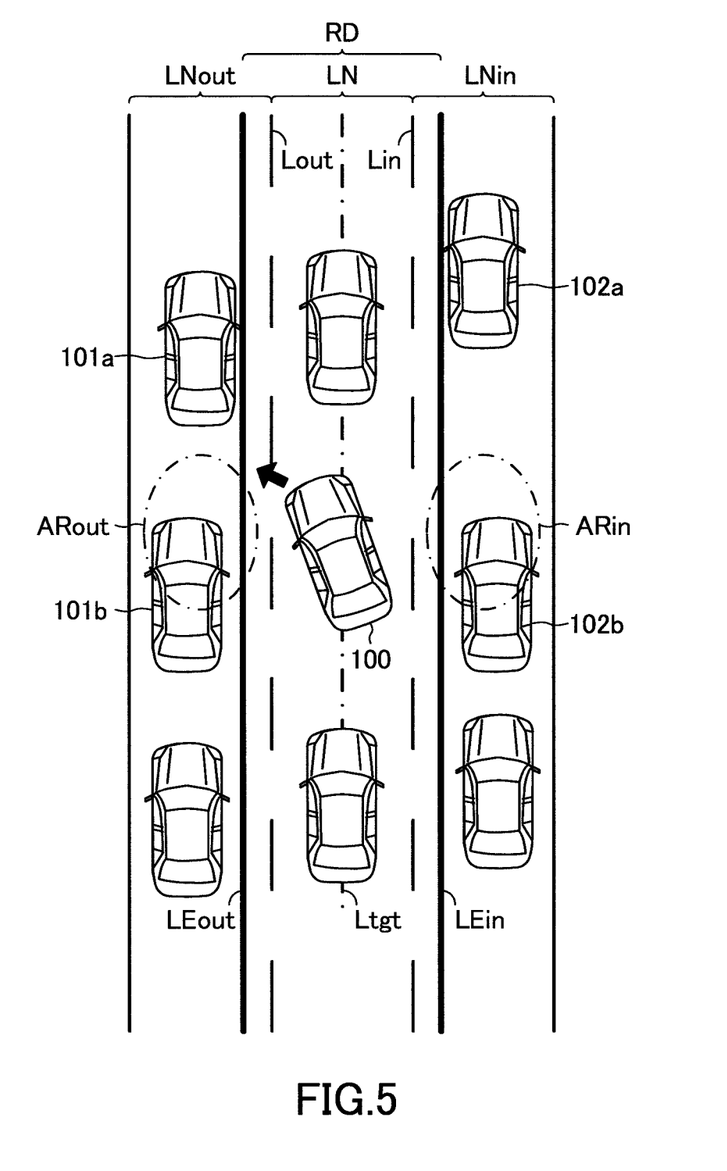
FIG. 5 is a view used for describing the operation of the vehicle driving assist apparatus according to the embodiment when the next lane vehicle exists in the lane next to the own vehicle traveling lane.

Further, as shown in FIG. 5, when a traffic jam occurs, the vehicle speeds of the next lane vehicles 101a, the next lane vehicle 101b traveling behind the next lane vehicle 101a, the next lane vehicle 102a and the next lane vehicle 102b traveling behind the next lane vehicle 102a may be generally zero, respectively.

In this case, the driver may be trying to cause the own vehicle 100 to move into between two next lane vehicles such as the next lane vehicles 101a and 101b traveling in the outer next lane LNout. When the driver operates (i.e. rotates) the steering wheel 61 by a certain amount or more in an attempt to cause the own vehicle 100 to move into between two next lane vehicles, the line extending along the right surface of the next lane vehicle such as the next lane vehicle 101a may be acquired as the outer end line LEout. In this case, the outer end line LDA control is executed on the basis of the outer end line LEout. Thus, the driver cannot cause the own vehicle 100 to move into between two next lane vehicles.

Similarly, the driver may be trying to cause the own vehicle 100 to move into between two next lane vehicles such as the next lane vehicles 102a and 102b traveling in the inner next lane LNin. When the driver operates (i.e. rotates) the steering wheel 61 by a certain amount or more in an attempt to cause the own vehicle 100 to move into between two next lane vehicles, the line extending along the left surface of the next lane vehicle such as the next lane vehicle 102a may be acquired as the inner end line LEin. In this case, the inner end line LDA control is executed on the basis of the inner end line LEin. Thus, the driver cannot move the own vehicle 100 into between two next lane vehicles.

Accordingly, the embodiment apparatus determines whether the acquired outer end line LEout is based on the next lane vehicle such as the next lane vehicle 101a by a pattern matching technique. In addition, the embodiment apparatus determines whether the acquired inner end line LEin is based on the next lane vehicle such as the next lane vehicle 102a by the pattern matching technique. In particular, the embodiment apparatus previously stores possible patterns of the image data indicating the next lane vehicle traveling in the outer next lane LNout and possible patterns of the image data indicating the next lane vehicle traveling in the inner next lane LNin.

The embodiment apparatus compares the image data indicating the outer end line LEout with the possible patters of the image data indicating the next lane vehicle such as the next lane vehicle 101a. When the image data corresponds to any of the possible patterns at a predetermined rate or more, the embodiment apparatus determines that the outer end line LEout indicated by the image data is the outer end line acquired on the basis of the next lane vehicle such as the next lane vehicle 101a. Similarly, the embodiment apparatus compares the image data indicating the inner end line LEin with the possible patters of the image data indicating the next lane vehicle such as the next lane vehicle 102a. When the image data corresponds to any of the possible patterns at a predetermined rate or more, the embodiment apparatus determines that the inner end line LEin indicated by the image data is the inner end line acquired on the basis of the next lane vehicle such as the next lane vehicle 102a.

When the embodiment apparatus determines that the outer end line LEout is the outer end line acquired on the basis of the next lane vehicle, the embodiment apparatus determines whether an outer steering angle $\theta sw\_out$ corresponding to the steering angle $\theta sw$ input to the steering wheel 61 by the driver in order to cause the own vehicle 100 to turn left, i.e., outward, is larger than or equal to a predetermined angle $\theta th$.

In this embodiment, the embodiment apparatus sets the predetermined angle $\theta th$ such that the predetermined angle $\theta th$ set when an own vehicle speed V corresponding to the vehicle speed of the own vehicle 100 is large, is smaller than the predetermined angle $\theta th$ set when the own vehicle speed V is small. In particular, the embodiment apparatus sets the predetermined angle $\theta th$ which increases as the own vehicle speed V increases (see blocks B1 and B2 in FIG. 6). In this regard, the embodiment apparatus may be configured to set the predetermined angle $\theta th$ to a constant value, independently of the own vehicle speed V.

When the outer steering angle $\theta sw\_out$ is larger than or equal to the predetermined angle $\theta th$, the embodiment apparatus determines whether the next lane vehicle exists in an area ARout of the outer next lane LNout into which the own vehicle 100 is trying to move, on the basis of the processed image data. In an example shown in FIG. 5, the next lane vehicle 101b is the next lane vehicle existing in the area ARout. Hereinafter, the next lane vehicle existing in the area ARout will be referred to as "the target outer next lane vehicle".

When the target outer next lane vehicle does not exist, the embodiment apparatus prohibits an execution of the outer end line LDA control. Thereby, the driver can cause the own vehicle 100 to move into the outer next lane LNout.

On the other hand, when the target outer next lane vehicle such as the next lane vehicle 101b shown in FIG. 5 exists, the embodiment apparatus determines whether a vehicle speed condition Cout is satisfied. The vehicle speed condition Cout is satisfied when the own vehicle speed V is smaller than or equal to a first vehicle speed Vth1, the vehicle speed Vout_b of the target outer next lane vehicle such as the next lane vehicle 101b is smaller than or equal to a second vehicle speed Vth2 and the vehicle speed Vout_a of the next lane vehicle such as the next lane vehicle 101a traveling in front of the target outer next lane vehicle such as the next lane vehicle 101b is smaller than or equal to a third vehicle speed Vth3. When the vehicle speed condition Cout is satisfied, the embodiment apparatus prohibits the execution of the outer end line LDA control.

Thereby, when the vehicle speeds of the own vehicle 100 and the next lane vehicles such as the next lane vehicles 101a and 101b traveling in the outer next lane LNout around the own vehicle 100 are smaller than or equal to a constant speed, respectively, the driver can cause the own vehicle 100 to move into the outer next lane LNout even though the target outer next lane vehicle such as the next lane vehicle 101b exists.

It should be noted that in this embodiment, the first to third vehicle speeds Vth1 to Vth3 may be the same as or different from each other as far as the first to third vehicle speeds Vth1 to Vth3 are set to zero or a value extremely close to zero, respectively.

Further, the embodiment apparatus acquires the vehicle speed Vout_b of the target outer next lane vehicle and the vehicle speed Vout_a of the next lane vehicle traveling in front of the target outer next lane vehicle, using the processed image data acquired at different timings. Also, the embodiment apparatus acquires the vehicle speed Vin_b of the target next lane vehicle traveling in the inner next lane LNin and the vehicle speed Vin_a of the next lane vehicle traveling in front of the target next lane vehicle traveling in the inner next lane LNin, using the processed image data acquired at different timings.

In addition, in the example shown in FIG. 5, the next lane vehicle traveling in front of the target outer next lane vehicle is the next lane vehicle 101a. Hereinafter, the next lane vehicle traveling in front of the target outer next lane vehicle will be referred to as "the preceding outer next lane vehicle".

When the outer end line LEout is not the outer end line based on the next lane vehicle such as the next lane vehicle 101a, the embodiment apparatus permits the execution of the outer end line LDA control. Further, when the outer steering angle θsw_out is smaller than the predetermined angle θth, the embodiment apparatus permits the execution of the outer end line LDA control. Furthermore, when the target outer next lane vehicle such as the next lane vehicle 101b exists, however, the vehicle speed condition Cout is not satisfied, the embodiment apparatus permits the execution of the outer end line LDA control.

Similarly, when the embodiment apparatus determines that the inner end line LEin is the inner end line acquired on the basis of the preceding next lane vehicle such as the next lane vehicle 102a, the embodiment apparatus determines whether an inner steering angle θsw_in corresponding to the steering angle θsw input to the steering wheel 61 by the driver in order to cause the own vehicle 100 to turn right, i.e., inward, is larger than or equal to the predetermined angle θth.

When the inner steering angle θsw_in is larger than or equal to the predetermined angle θth, the embodiment apparatus determines whether the next lane vehicle exists in an area ARin of the inner next lane LNin into which the own vehicle 100 is trying to move, on the basis of the processed image data. In the example shown in FIG. 5, the next lane vehicle 102b is the next lane vehicle existing in the area ARin. Hereinafter, the next lane vehicle existing in the area ARin will be also referred to as "the target inner next lane vehicle".

When the target inner next lane vehicle does not exist, the embodiment apparatus prohibits an execution of the inner end line LDA control. Thereby, the driver can cause the own vehicle 100 to move into the inner next lane LNin.

On the other hand, when the target outer next lane vehicle such as the next lane vehicle 102b shown in FIG. 5 exists, the embodiment apparatus determines whether a vehicle speed condition Cin is satisfied. The vehicle speed condition Cin is satisfied when the own vehicle speed V is smaller than or equal to the first vehicle speed Vth1, the vehicle speed Vin_b of the target inner next lane vehicle such as the next lane vehicle 101b is smaller than or equal to the second vehicle speed Vth2 and the vehicle speed Vin_a of the next lane vehicle such as the next lane vehicle 102a traveling in front of the target inner next lane vehicle such as the next lane vehicle 101b is smaller than or equal to the third vehicle speed Vth3. When the vehicle speed condition Cin is satisfied, the embodiment apparatus prohibits the execution of the inner end line LDA control.

Thereby, when the vehicle speeds of the own vehicle 100 and the next lane vehicles such as the next lane vehicles 102a and 102b traveling in the inner next lane LNin around the own vehicle 100 are smaller than or equal to a constant speed, respectively, the driver can cause the own vehicle 100 to move into the inner next lane LNin even though the target inner next lane vehicle such as the next lane vehicle 102b exists.

It should be noted that in the example shown in FIG. 5, the preceding next lane vehicle traveling in front of the target inner next lane vehicle 102b is the next lane vehicle 102a. Hereinafter, the next lane vehicle traveling in front of the target inner next lane vehicle will be referred to as "the preceding inner next lane vehicle".

When the inner end line LEin is not the inner end line based on the next lane vehicle such as the next lane vehicle 102a, the embodiment apparatus permits the execution of the inner end line LDA control. Further, when the inner steering angle θsw_in is smaller than the predetermined angle θth, the embodiment apparatus permits the execution of the inner end line LDA control. Furthermore, when the target inner next lane vehicle such as the next lane vehicle 102b exists, however, the vehicle speed condition Cin is not satisfied, the embodiment apparatus permits the execution of the inner end line LDA control.

The summary of the operation of the embodiment apparatus has been described. With the embodiment apparatus, the driver can cause the own vehicle 100 to move into the outer or inner next lane LNout or LNin.

Concrete Operation of Embodiment Apparatus

Below, a concrete operation of the embodiment apparatus will be described. The CPU of the driving assist ECU 10 of the embodiment apparatus is configured or programmed to execute a routine shown by a flowchart in FIG. 6 each time a predetermined time Tcal elapses. Therefore, at a predetermined timing, the CPU starts a process from a step 600 in FIG. 6 and then, executes a process of a step 610 described below. Thereafter, the CPU proceeds with the process to a step 615.

Figure 6:
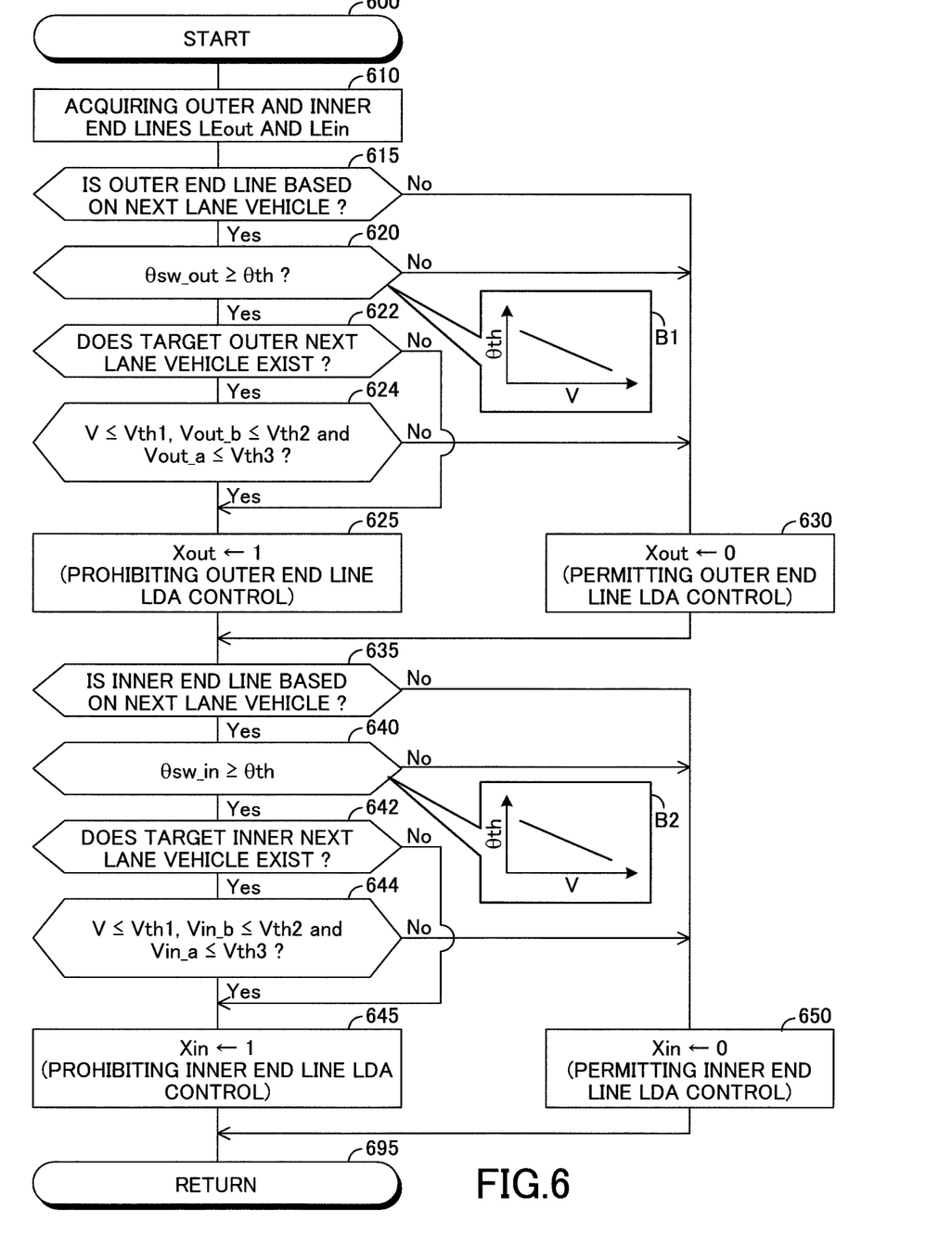
FIG. 6 is a flowchart for showing a routine executed by a CPU of a driving assist ECU shown in FIG. 1.

Step 610: The CPU acquires the outer and inner end lines LEout and LEin as described above.

When the CPU proceeds with the process to the step 615, the CPU determines whether the outer end line LEout is the outer end line based on the next lane vehicle such as the next lane vehicle 101a. When the outer end line LEout is the outer end line based on the next lane vehicle, the CPU determines "Yes" at the step 615 and then, proceeds with the process to a step 620 to determine whether the outer steering angle θsw_out is larger than or equal to the predetermined angle θth.

When the outer steering angle θsw_out is larger than or equal to the predetermined angle θth, the CPU determines "Yes" at the step 620 and then, proceeds with the process to a step 622 to determine whether the target outer next lane vehicle such as the next lane vehicle 101b shown in FIG. 5 exists. When the target outer next lane vehicle exists, the CPU determines "Yes" at the step 622 and then, proceeds with the process to a step 624 to determine whether the vehicle speed condition Cout is satisfied. As described above, the vehicle speed condition Cout is satisfied when the own vehicle speed V is smaller than or equal to the first vehicle speed Vth1, the vehicle speed Vout_b of the target outer next lane vehicle such as the next lane vehicle 101b is smaller than or equal to the second vehicle speed Vth2 and the vehicle speed Vout_a of the preceding outer next lane vehicle such as the next lane vehicle 101a is smaller than or equal to the third vehicle speed Vth3.

When the vehicle condition Cout is satisfied, the CPU determines "Yes" at the step 624 and then, executes a process of a step 625 described below. Thereafter, the CPU proceeds with the process to a step 635.

Step 625: The CPU sets a value of an outer end line LDA prohibition flag Xout to "1". Thereby, the execution of the outer end line LDA control is prohibited (see a determination "No" at a step 710 in FIG. 7 described later).

On the other hand, when the vehicle speed condition Cout is not satisfied at a time of the CPU executing a process of the step 624, the CPU determines "No" at the step 624 and then, executes a process of a step 630 described below. Thereafter, the CPU proceeds with the process to the step 635.

Step 630: The CPU sets the value of the outer end line LDA prohibition flag Xout to "0". Thereby, the execution of the outer end line LDA control is permitted (see a determination "Yes" at the step 710 described later).

When the target outer next lane vehicle does not exist at a time of the CPU executing a process of the step 622, the CPU determines "No" at the step 622 and then, executes the process of the step 625 described above. Thereafter, the CPU proceeds with the process to the step 635. Thereby, the execution of the outer end line LDA control is prohibited (see the determination "No" at the step 710 described later).

When the outer steering angle θsw_out is smaller than the predetermined angle θth at a time of the CPU executing a process of the step 620, the CPU determines "No" at the step 620 and then, executes the process of the step 630 described above. Thereafter, the CPU proceeds with the process to the step 635. Thereby, the execution of the outer end line LDA control is permitted (see the determination "Yes" at the step 710 described later).

When the outer end line LEout is not the outer end line based on the next lane vehicle such as the next lane vehicle 101a at a time of the CPU executing a process of the step 615, the CPU determines "No" at the step 615 and then, executes the process of the step 630 described above. Thereafter, the CPU proceeds with the process to the step 635. Thereby, the execution of the outer end line LDA control is permitted (see the determination "Yes" at the step 710 described later).

When the CPU proceeds with the process to the step 635, the CPU determines whether the inner end line LEin is the inner end line based on the next lane vehicle such as the next lane vehicle 102a. When the inner end line LEin is the inner end line based on the next lane vehicle, the CPU determines "Yes" at the step 635 and then, proceeds with the process to a step 640 to determine whether the inner steering angle θsw_in is larger than or equal to the predetermined angle θth.

When the inner steering angle θsw_in is larger than or equal to the predetermined angle θth, the CPU determines "Yes" at the step 640 and then, proceeds with the process to a step 642 to determine whether the target inner next lane vehicle such as the next lane vehicle 102b shown in FIG. 5 exists. When the target inner next lane vehicle exists, the CPU determines "Yes" at the step 642 and then, proceeds with the process to a step 644 to determine whether the vehicle speed condition Cin is satisfied. As described above, the vehicle speed condition Cin is satisfied when the own vehicle speed V is smaller than or equal to the first vehicle speed Vth1, the vehicle speed Vin_b of the target inner next lane vehicle such as the next lane vehicle 102b is smaller than or equal to the second vehicle speed Vth2 and the vehicle speed Vin_a of the preceding inner next lane vehicle such as the next lane vehicle 102a is smaller than or equal to the third vehicle speed Vth3.

When the vehicle condition Cin is satisfied, the CPU determines "Yes" at the step 644 and then, executes a process of a step 645 described below. Thereafter, the CPU proceeds with the process to a step 695 to terminate this routine once.

Step 645: The CPU sets a value of an inner end line LDA prohibition flag Xin to "1". Thereby, the execution of the inner end line LDA control is prohibited (see a determination "No" at a step 730 in FIG. 7 described later).

On the other hand, when the vehicle speed condition Cin is not satisfied at a time of the CPU executing a process of the step 644, the CPU determines "No" at the step 644 and then, executes a process of a step 650 described below. Thereafter, the CPU proceeds with the process to the step 695 to terminate this routine once.

Step 650: The CPU sets the value of the inner end line LDA prohibition flag Xin to "0". Thereby, the execution of the inner end line LDA control is permitted (see a determination "Yes" at the step 730 described later).

When the target inner next lane vehicle does not exist at a time of the CPU executing a process of the step 642, the CPU determines "No" at the step 642 and then, executes the process of the step 645 described above. Thereafter, the CPU proceeds with the process to the step 695 to terminate this routine once. Thereby, the execution of the inner end line LDA control is prohibited (see the determination "No" at the step 730 described later).

When the inner steering angle θsw_in is smaller than the predetermined angle θth at a time of the CPU executing a process of the step 640, the CPU determines "No" at the step 640 and then, executes the process of the step 650 described above. Thereafter, the CPU proceeds with the process to the step 695 to terminate this routine once. Thereby, the execution of the inner end line LDA control is permitted (see the determination "Yes" at the step 730 described later).

When the inner end line LEin is not the outer end line based on the next lane vehicle such as the next lane vehicle 102a at a time of the CPU executing a process of the step 635, the CPU determines "No" at the step 635 and then, executes the process of the step 650 described above. Thereafter, the CPU proceeds with the process to the step 695 to terminate this routine once. Thereby, the execution of the inner end line LDA control is permitted (see the determination "Yes" at the step 730 described later).

Figure 7:
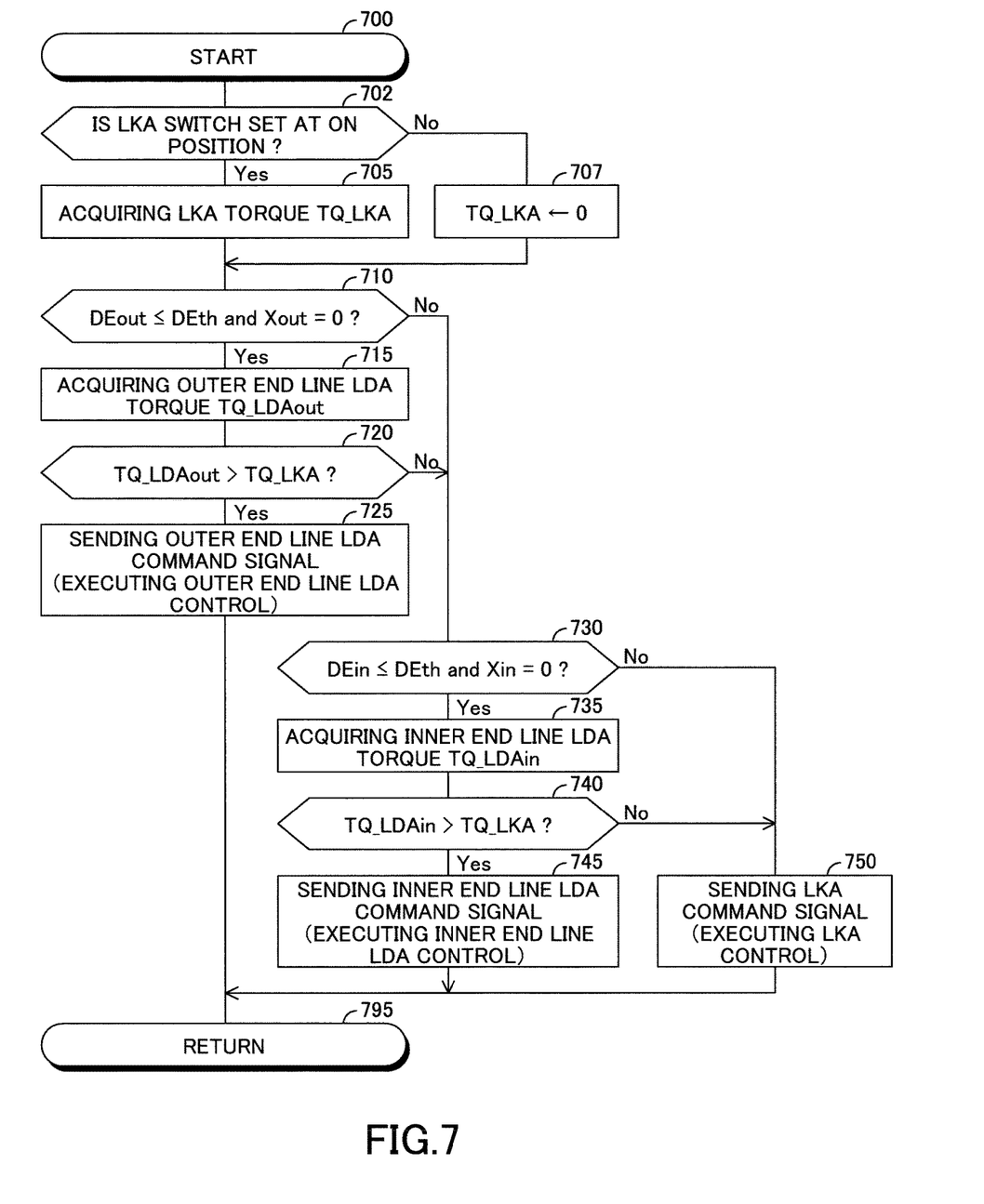
FIG. 7 is a flowchart for showing a routine executed by the CPU.

Further, the CPU of the driving assist ECU 10 is configured or programmed to execute a routine shown by a flowchart in FIG. 7 each time the predetermined time Tcal elapses. At a predetermined timing, the CPU starts a process from a step 700 of FIG. 7 and then, proceeds with the process to a step 702 to determine whether the LKA switch 56 is set at the ON position.

When the LKA switch 56 is set at the ON position, the CPU determines "Yes" at the step 702 and then, executes a process of a step 705 described below. Thereafter, the CPU proceeds with the process to a step 710.

Step 705: The CPU acquires the LKA torque TQ_LKA as described above.

On the other hand, when the LKA switch 56 is set at the OFF position, the CPU determines "No" at the step 702 and then, executes a process of a step 707 described below. Thereafter, the CPU proceeds with the process to the step 710.

Step 707: The CPU sets the LKA torque TQ_LKA to zero. Thereby, substantially, the execution of the LKA control is prohibited.

When the CPU proceeds with the process to the step 710, the CPU determines whether the outer end line distance DEout is smaller than or equal to the predetermined distance DEth and the value of the outer end line LDA prohibition flag Xout is "0". When the outer end line distance DEout is smaller than or equal to the predetermined distance DEth and the value of the outer end line LDA prohibition flag Xout is "0", the CPU determines "Yes" at the step 710 and then, executes a process of a step 715 described below. Thereafter, the CPU proceeds with the process to a step 720.

Step 715: The CPU acquires the outer end line LDA torque TQ_LDAout as described above.

When the CPU proceeds with the process to the step 720, the CPU determines whether the outer end line LDA torque TQ_LDAout is larger than the LKA torque TQ_LKA. When the outer end line LDA torque TQ_LDAout is larger than the LKA torque TQ_LKA, the CPU determines "Yes" at the step

720 and then, executes a process of a step 725 described below. Thereafter, the CPU proceeds with the process to a step 795 to terminate this routine once.

Step 725: The CPU sends the outer end line LDA command signal to the steering ECU 20. When the steering ECU 20 receives the outer end line LDA command signal, the steering ECU 20 executes the outer end line LDA control. In this case, the steering ECU 20 activates the EPS device 21 to apply the steering torque TQ corresponding to the outer end line LDA torque TQ_LDAout to the steering column 62 to prevent the own vehicle 100 from departing the own vehicle traveling road RD beyond the outer end line LEout.

On the other hand, when the LKA torque TQ_LKA is larger than or equal to the outer end line LDA torque TQ_LDAout at a time of the CPU executing a process of the step 720, the CPU determines "No" at the step 720 and then, proceeds with the process to a step 730.

In addition, when the outer end line distance DEout is larger than the predetermined distance DEth or the value of the outer end line LDA prohibition flag Xout is "1" at a time of the CPU executing a process of the step 710, the CPU determines "No" at the step 710 and then, proceeds with the process to the step 730.

When the CPU proceeds with the process to the step 730, the CPU determines whether the inner end line distance DEin is smaller than or equal to the predetermined distance DEth and the value of the inner end line LDA prohibition flag Xin is "0". When the inner end line distance DEin is smaller than or equal to the predetermined distance DEth and the value of the inner end line LDA prohibition flag Xin is "0", the CPU determines "Yes" at the step 730 and then, executes a process of a step 735 described below. Thereafter, the CPU proceeds with the process to a step 740.

Step 735: The CPU acquires the inner end line LDA torque TQ_LDAin as described above.

When the CPU proceeds with the process to the step 740, the CPU determines whether the inner end line LDA torque TQ_LDAin is larger than the LKA torque TQ_LKA. When the inner end line LDA torque TQ_LDAin is larger than the LKA torque TQ_LKA, the CPU determines "Yes" at the step 740 and then, executes a process of a step 745 described below. Thereafter, the CPU proceeds with the process to the step 795 to terminate this routine once.

Step 745: The CPU sends the inner end line LDA command signal to the steering ECU 20. When the steering ECU 20 receives the inner end line LDA command signal, the steering ECU 20 executes the inner end line LDA control. In this case, the steering ECU 20 activates the EPS device 21 to apply the steering torque TQ corresponding to the inner end line LDA torque TQ_LDAin to the steering column 62 to prevent the own vehicle 100 from departing from the own vehicle traveling road RD beyond the inner end line LEin.

On the other hand, when the LKA torque TQ_LKA is larger than or equal to the inner end line LDA torque TQ_LDAin at a time of the CPU executing a process of the step 740, the CPU determines "No" at the step 740 and then, executes a process of a step 750 described below. Thereafter, the CPU proceeds with the process to the step 795 to terminate this routine once.

Step 750: The CPU sends an LKA command signal to the steering ECU 20.

When the steering ECU 20 receives the LKA command signal, the CPU executes the LKA control. In this case, the steering ECU 20 activates the EPS device 21 to apply the steering torque TQ corresponding to the LKA torque TQ_LKA to the steering column 62 to cause the own vehicle 100 to travel along the target traveling line Ltgt.

In addition, when the inner end line distance DEin is larger than the predetermined distance DEth or the value of the inner end line LDA prohibition flag Xin is "1" at a time of the CPU executing a process of the step 730, the CPU determines "No" at the step 730 and then, executes the process of the step 750 described above. Thereafter, the CPU proceeds with the process to the step 795 to terminate this routine once. In this case, the LKA control is executed.

The concrete operation of the embodiment apparatus has been described. With the embodiment apparatus, when the outer end line LEout is the outer end line based on the next lane vehicle such as the next lane vehicle 101*a* (see a determination "Yes" at the step 615), the driver operates the steering wheel 61 by the outer steering angle θsw_out larger than or equal to the predetermined angle θth in order to cause the own vehicle 100 to move into the outer next lane LNout and the target outer next lane vehicle such as the next lane vehicle 101*b* does not exist (see a determination "Yes" at the step 620 and the determination "No" at the step 622), the outer end line LDA control is not executed (see the process of the step 625 and the determination "No" at the step 710). Thus, the driver can cause the own vehicle 100 to move into the outer next lane LNout.

When the own vehicle speed V, the vehicle speed Vout_b of the target outer next lane vehicle such as the next lane vehicle 101*b* and the vehicle speed Vout_a of the preceding outer next lane vehicle such as the next lane vehicle 101*a* are smaller than or equal to a certain constant speed, respectively (see the determination "Yes" at the step 624), the outer end line LDA control is not executed (see the process of the step 625 and the determination "No" at the step 720) even though the target outer next lane vehicle such as the next lane vehicle 101*b* exists (see the determination "Yes" at the step 622). Thus, the driver can cause the own vehicle 100 to move into between two next lane vehicles traveling in the outer next lane LNout, for example, when the traffic jam occurs.

Similarly, with the embodiment apparatus, when the inner end line LEin is the inner end line based on the next lane vehicle such as the next lane vehicle 102*a* (see a determination "Yes" at the step 635), the driver operates the steering wheel 61 by the inner steering angle θsw_in larger than or equal to the predetermined angle θth in order to cause the own vehicle 100 to move into the inner next lane LNin and the target inner next lane vehicle such as the next lane vehicle 102*b* does not exist (see a determination "Yes" at the step 640 and the determination "No" at the step 642), the inner end line LDA control is not executed (see the process of the step 645 and the determination "No" at the step 730). Thus, the driver can cause the own vehicle 100 to move into the inner next lane LNin.

When the own vehicle speed V, the vehicle speed Vin_b of the target inner next lane vehicle such as the next lane vehicle 102*b* and the vehicle speed Vin_a of the preceding inner next lane vehicle such as the next lane vehicle 102*a* are smaller than or equal to a certain constant speed, respectively (see the determination "Yes" at the step 644), the inner end line LDA control is not executed (see the process of the step 645 and the determination "No" at the step 730) even though the target inner next lane vehicle such as the next lane vehicle 102*b* exists (see the determination "Yes" at the step 642). Thus, the driver can cause the own vehicle 100 to move into between two next lane vehicles traveling in the inner next lane LNin, for example, when the traffic jam occurs.

It should be noted that the present invention is not limited to the aforementioned embodiment and various modifications can be employed within the scope of the present invention.

For example, the steps 622 and 624 may be omitted from the routine shown in FIG. 6. In this case, when it is determined "Yes" at the step 620, the process of the step 625 is executed. Further, the steps 642 and 644 may be omitted from the routine shown in FIG. 6. In this case, when it is determined "Yes" at the step 640, the process of the step 645 is executed.

Furthermore, when the own vehicle 100 includes a millimeter wave radar sensor such as a millimeter wave radar for transmitting the millimeter wave ahead of the own vehicle 100, the embodiment apparatus may be configured to determine whether the outer end line LEout is the outer end line based on the target outer next lane vehicle such as the next lane vehicle 101a on the basis of data from the millimeter wave radar sensor and whether the inner end line LEin is the inner end line based on the target inner next lane vehicle such as the next lane vehicle 102a on the basis of data from the millimeter wave radar sensor Further, when the own vehicle 100 includes a brake device for applying braking forces to the wheels, the embodiment apparatus may be configured to cause the brake device to apply the braking force to at least one wheel to control the traveling direction of the own vehicle 100 in the LKA and LDA controls in place of or in addition to an application of the steering torque TQ from the EPS device 21 to the steering column 62.

What is claimed is:

1. A vehicle driving assist apparatus for use with a vehicle, the vehicle driving assist apparatus comprising:
   a camera mounted on the vehicle, the camera being configured to take an image of a landscape ahead of the vehicle and acquire image data corresponding to data of the taken image; and
   an electronic control unit configured to:
      acquire a road end line corresponding to a boundary between a road on which the vehicle travels and an area outside of the road, based on the acquired image data,
      acquire an input operation amount corresponding to an amount of an operation input to a steering wheel of the vehicle that causes the vehicle to move into a next lane that is adjacent to a lane in which the vehicle travels,
      execute a road end line departure prevention control that controls a traveling direction of the vehicle to prevent the vehicle from departing from the acquired road end line when a control prohibition condition is not satisfied, and
      prevent the road end line departure prevention control from executing when the control prohibition condition is satisfied, the control prohibition condition including: (i) the at least one next lane vehicle traveling in the next lane being acquired as the road end line, and (ii) the input operation amount being larger than or equal to the predetermined operation amount.

2. The vehicle driving assist apparatus according to claim 1, wherein the control prohibition condition includes a condition that the next lane vehicle does not exist in an area of the next lane into which the vehicle is attempting to move.

3. The vehicle driving assist apparatus according to claim 1, wherein
   when a target vehicle corresponding to the next lane vehicle exists in an area of the next lane into which the vehicle is attempting to move, the control prohibition condition includes a condition that:
      (a) a traveling speed of the vehicle is smaller than or equal to a first speed,
      (b) a traveling speed of the target vehicle is smaller than or equal to a second speed, and
      (c) a traveling speed of the next lane vehicle traveling in front of the target vehicle is smaller than or equal to a third speed.

4. The vehicle driving assist apparatus according to claim 1, wherein the electronic control unit is configured to set the predetermined operation amount such that the predetermined operation amount decreases as the traveling speed of the vehicle decreases.

* * * * *